United States Patent [19]

Hehl

[11] Patent Number: 4,518,338

[45] Date of Patent: May 21, 1985

[54] INJECTION MOLDING MACHINE WITH MOLD CHANGING AND MOLD PRECONDITIONING DEVICE

[76] Inventor: Karl Hehl, Arthur-Hehl-Strasse 32, 7298 Lossburg 1, Fed. Rep. of Germany

[21] Appl. No.: 506,026

[22] Filed: Jun. 20, 1983

[30] Foreign Application Priority Data

Jun. 18, 1982 [DE] Fed. Rep. of Germany ....... 3222828

[51] Int. Cl.³ .......................... B29C 1/00; B29F 1/00
[52] U.S. Cl. .................................. 425/183; 425/185; 425/186; 425/190; 425/547; 425/575; 249/102; 249/79
[58] Field of Search ............... 425/183, 185, 186, 190, 425/192 R, 547, 548, 575, 576; 264/328.7, 328.11, 328.14, 328.16; 249/102, 103, 104

[56] References Cited

U.S. PATENT DOCUMENTS

| | | | |
|---|---|---|---|
| 3,221,366 | 12/1965 | Couchman | 425/186 |
| 3,663,136 | 5/1972 | Westermann | 425/186 |
| 3,973,891 | 8/1976 | Yamada | 425/575 |
| 3,982,869 | 9/1976 | Eggers | 425/575 |
| 4,416,604 | 11/1983 | Bender et al. | 425/183 |
| 4,421,469 | 12/1983 | Egger et al. | 425/183 |

FOREIGN PATENT DOCUMENTS 1629746 2/1971 Fed. Rep. of Germany.
57-201636 12/1982 Japan ................................. 425/190

OTHER PUBLICATIONS

Battenfeld-Symposium mit Sonderschau 4.-7., Mai 1982, "Rationalisieren Durch Automatisieren".

Primary Examiner—J. Howard Flint, Jr.
Attorney, Agent, or Firm—Joseph A. Geiger

[57] ABSTRACT

A device for the program-controllable exchange of injection molding dies and for the continuous preconditioning of an injection molding die, prior to and during its insertion into the die closing unit of an injection molding machine, comprising a translation table with two die emplacements which are alternatingly movable into transverse alignment with the die clamping space, for transfer of a die assembly by means of an endless roller chain with drive pins and a drive rack entraining the die assembly. Each die emplacement has a captive drive rack which carries a coupling head for flexible temperature conditioning supply lines and each die assembly has a matching coupling head with coupling valves and an identification code incorporated in a multi-conductor connection, all connections being established by the mere lowering of the die assembly onto its die emplacement.

23 Claims, 14 Drawing Figures

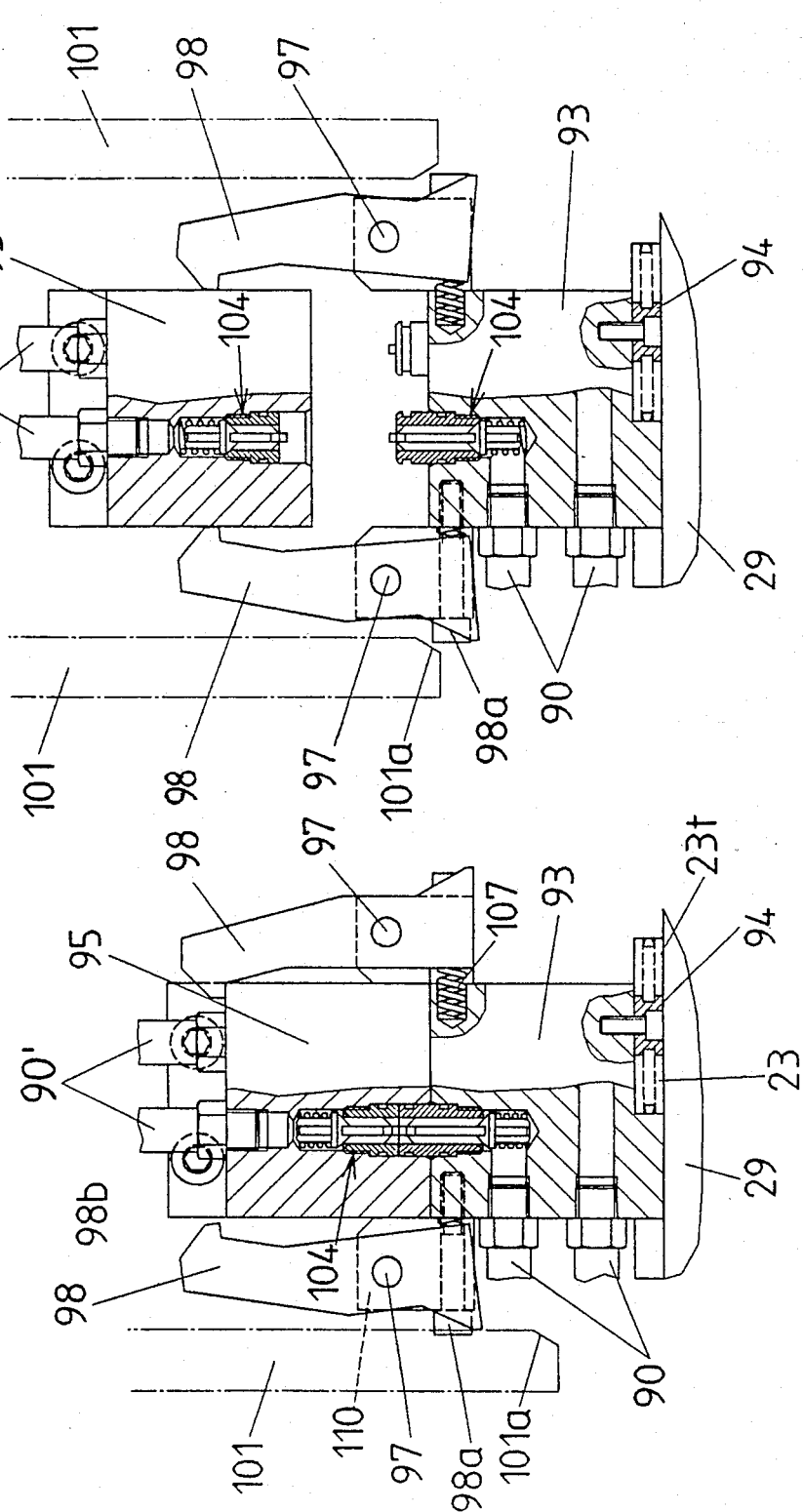

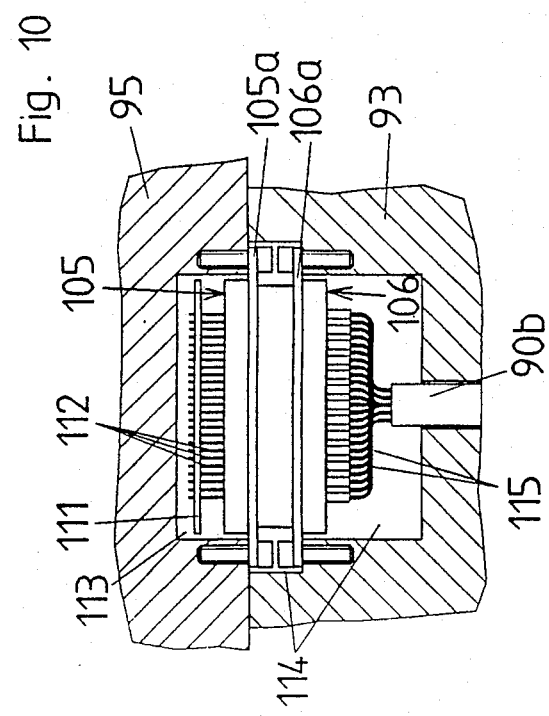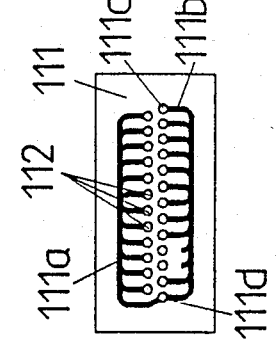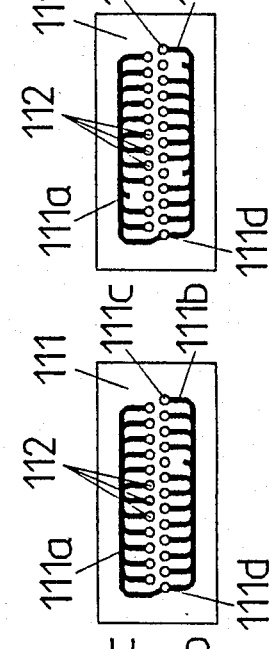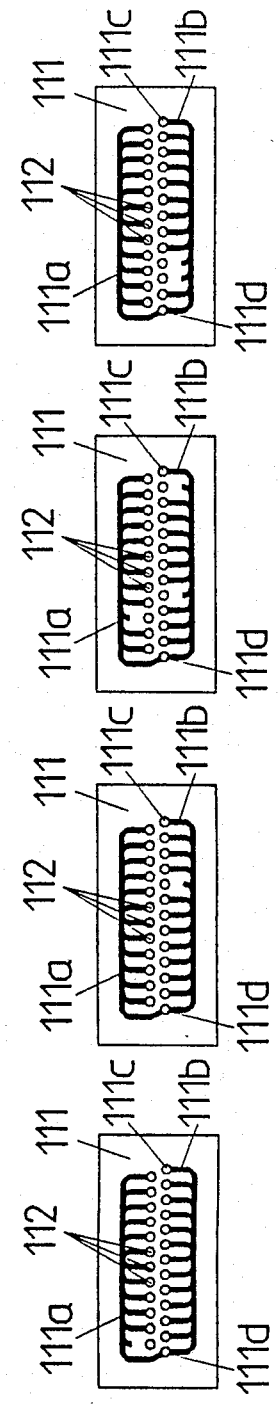

INJECTION MOLDING MACHINE WITH MOLD CHANGING AND MOLD PRECONDITIONING DEVICE

BACKGROUND OF THE INVENTION

1. Field of the Invention

The present invention relates to injection molding machines and, more particularly, to an injection molding machine with a device which is adapted for the program-controlled exchange of injection molding dies and for the continuous preconditioning of an injection molding die, prior to and during its insertion into the die closing unit of the machine.

2. Description of the Prior Art

The changeover of an injection molding machine from the production of one part to the production of another part requires an exchange of injection molding dies in the die closing unit and, in some cases, also an exchange of injection units.

The exchange of injection molding dies tends to cost a considerable amount of time machine downtime, not only for the detachment and removal of the previously used die assembly and the insertion and attachment of the new die assembly, but also for the transfer from the former to the latter of the various fluid lines for temperature conditioning, including all electrical and other operating connections.

Before production operations can be resumed, the newly installed injection molding die also needs to be preheated to the required operating temperature, as part of the overall die preconditioning procedure. In some cases, it may be sufficient to limit the preheating to the achievement of a given average temperature of the die assembly. In other cases, however, it becomes necessary to establish a preheating temperature gradient as close as possible to the temperature gradient which establishes itself in the die assembly during the production run. For, only with such careful preconditioning will it be possible to hold the maximum weight spread among the parts of an entire production run within the expected range of 0.6 to 0.8% for precision-molded parts. Some injection molding dies may thus require up to two hours and more of preconditioning time.

As part of a mechanized die exchange procedure, it has therefore already been suggested to use hydraulically operated clamping devices in the place of the conventional threaded fasteners to clamp the two die halves to their die carrier plates. Several such clamping devices are known from the prior art. An improved attachment mechanism for interchangeable injection molding dies is disclosed in my copending U.S. patent application, Ser. No. 449,550, filed December 13, 1982, now U.S. Pat. No. 4,473,346.

In a pamphlet entitled "Battenfeld-Symposium mit Sonderschau 4.-7. Mai 1982", it is further suggested to provide a horizontal transfer device in the form of a dolly, the wheels of which are supported on the factory floor. The dolly is guided for longitudinal translational movements along the machine base, carrying on its top a horizontal roller conveyor. A die assembly resting on this roller conveyor can be pushed horizontally into the clamping space of the die closing unit, using a drive spindle, for example.

The two die halves of the die assembly are provided with special back plates which are larger than the die plates themselves, so as to allow for a mechanized insertion and clamping of the die assembly. In the prior art device mentioned, the back plates of the two die halves form upwardly and downwardly protruding flanges with a tapered shoulder profile. The latter is engageable by a plurality of matchingly tapered clamping plungers advancing vertically from above and below against the back plates.

This prior art disclosure further suggests the arrangement of fluid line couplings in the die closing unit which, in the course of insertion or removal of the die assembly, are connected or disconnected, respectively. These line couplings are located on the opposite side of the die exchange dolly, i.e. on the front side of the machine.

Such a device has several shortcomings: Among them are the fact that the movable die carrier plate needs to be moved away from the die and that, consequently, it cannot participate in the support and guidance of the die assembly during the transfer movement. The support of the assembly is therefore one-sided. The problem-free reengagement of the movable die carrier plate over the centering collar of the movable die plate is not assured.

The absence of a positively controlled transfer drive, combined with the fact that the level of the roller conveyor is determined by the engagement between the dolly wheels and the floor, independently of the machine base, preclude a programmed, fully automated exchange of injection molding dies. Furthermore, the fact that the die assembly is guided on only one of the two die carrier plates limits the application of this device to die assemblies of moderate weight.

No provision is made in this prior art device for the possibility of preconditioning a second die assembly, while the first die assembly is still in service in the previous production run.

In the German Offenlegungsschrift (Publ. Application) No. 16 29 746 is disclosed an injection molding machine for rubber articles which makes use of a mold preheating cabinet with a number of preheating compartments into which injection molding dies are deposited, before being transferred onto a rotating platform holding a number of identical die assemblies. Each compartment of the preheating cabinet has a heatable compartment bottom.

The die assemblies are transferred between the preheating cabinet and the rotating platform of the injection molding machine by means of a horizontal conveyor table which can be raised and lowered in a gimbal frame which is rotatable about a vertical axis. The heat input to the die assemblies takes place by exterior convective contact only, and heat input during the transfer of a die assembly from the preheating cabinet to the injection molding machine is not possible.

SUMMARY OF THE INVENTION

Underlying the present invention is the primary objective of suggesting an improved injection molding machine which includes a device adapted for the program-controlled exchange of injection molding dies and for the continuous temperature-preconditioning of an injection molding die, prior to and during its insertion into the die closing unit of the machine.

The present invention proposes to attain this objective by suggesting a novel device featuring a longitudinally movable translation table with two identical die emplacements which are alternatingly translatable to a transfer position in transverse alignment with the operating position of the die assembly in the clamping space of the die closing unit, the device having two separate sets of conditioning fluid supply lines associated with the two die emplacements on the translation table, each set of supply lines being arranged to connect a die assembly in operating position or in waiting position to a temperature conditioning unit.

The two sets of supply lines have flexible length portions, the beginning points of which are so arranged that each set of supply lines can accommodate the movements of a connected die assembly between its waiting position in a die emplacement and the operating position in the die closing unit.

In a preferred embodiment of the invention, the die carrier members of the die closing unit and each die emplacement of the translation table have cooperating faces guiding and supporting a die assembly, the guide faces being aligned for a straight-line transfer path, when the die emplacement coincides with the transfer position. For this purpose, each die assembly has standardized rectangular back plates on its two die halves with protruding flange portions forming supporting end faces and vertical guide faces cooperating with the supporting faces and guide faces of the die emplacements and of the two die carrier members.

The invention further suggests a transfer drive which is engageable with a die assembly in the transfer position on the translation table and which is adapted to entrain the die assembly in a positively controlled transfer movement between the transfer position and the operating position in the die closing unit.

The proposed transfer drive has a horizontally circulating endless roller chain arranged on the lower part of the stationary die carrier member. The roller chain is equipped with a number of drive members cooperating with matching drive recesses of a drive rack which is connected to the die assembly.

As an advantageous alternative to providing a separate drive rack for each die assembly, the invention suggests a configuration in which a detachable drive rack remains associated with each die emplacement of the translation table. In the die emplacements, the drive racks are vertically restrained in their guides, so that they disconnect from the die assemblies, when the latter are lifted off the translation table. Restraining pins which normally block transfer movements of the drive racks are retracted, when the die emplacement is in the transfer position.

The invention further suggests two configurations for the conditioning fluid supply lines. In one configuration, the flexible length portions of the supply lines begin at the mouths of two harness pipes which are located above and approximately halfway between the operating position in the die closing unit and two die emplacements on the translation table in waiting position.

In a second configuration, featuring a modified transfer drive assembly and a captive drive rack in each of the two die emplacements, each drive rack carries a coupling head to which the ends of the flexible length portions of a set of conditioning supply lines are permanently connected. Each die assembly carries a matching coupling head on its stationary die half. The arrangement of automatically opening coupling valves in the coupling heads makes it possible to automatically establish line connections, when a die assembly is lowered onto a die emplacement and to automatically break the connection by simply lifting the die assembly from its die emplacement.

The coupling heads preferably also carry cooperating multi-conductor electrical couplings, including an identification code in the electrical coupling of the die assembly, for the program-controlled determination of temperature conditioning parameters and other machine operating data of the particular die assembly.

The novel device of the invention makes it possible to completely precondition a die assembly, prior to its insertion into the die closing unit, so that the downtime for the changeover from the production of one part to the production of another part is reduced to an absolute minimum, viz. the time required for the program-controlled mold changing mechanism to remove the previously used die assembly and insert the preconditioned die assembly.

This advantage applies to all situations in which the injection unit and the injected material remain unchanged. It is also achievable in situations in which a new part requires a different kind of plastic material, and where the succession of production runs is chosen in such a way that the die assembly for the new part has its sprue channel arranged in a different plane from the preceding die assembly. In this case, it is possible to also install and precondition the new injection unit during the current production run.

BRIEF DESCRIPTION OF THE DRAWINGS

Further special features and advantages of the invention will become apparent from the description following below, when taken together with the accompanying drawings which illustrate, by way of example, a preferred embodiment of the invention, represented in the various figures as follows:

FIGS. 7 and 8 show, at an enlarged scale, the partially cross-sectioned coupling heads of a die emplacement and of a die assembly, in their engaged and disengaged positions;

FIG. 10 shows a further enlarged detail of the coupling heads of FIGS. 7-9 in a cross section taken along line X—X of FIG. 9; and FIGS. 10a through 10d show different examples of code patterns obtainable with the couplings of FIG. 10.

DESCRIPTION OF THE PREFERRED EMBODIMENTS

Figure 1:
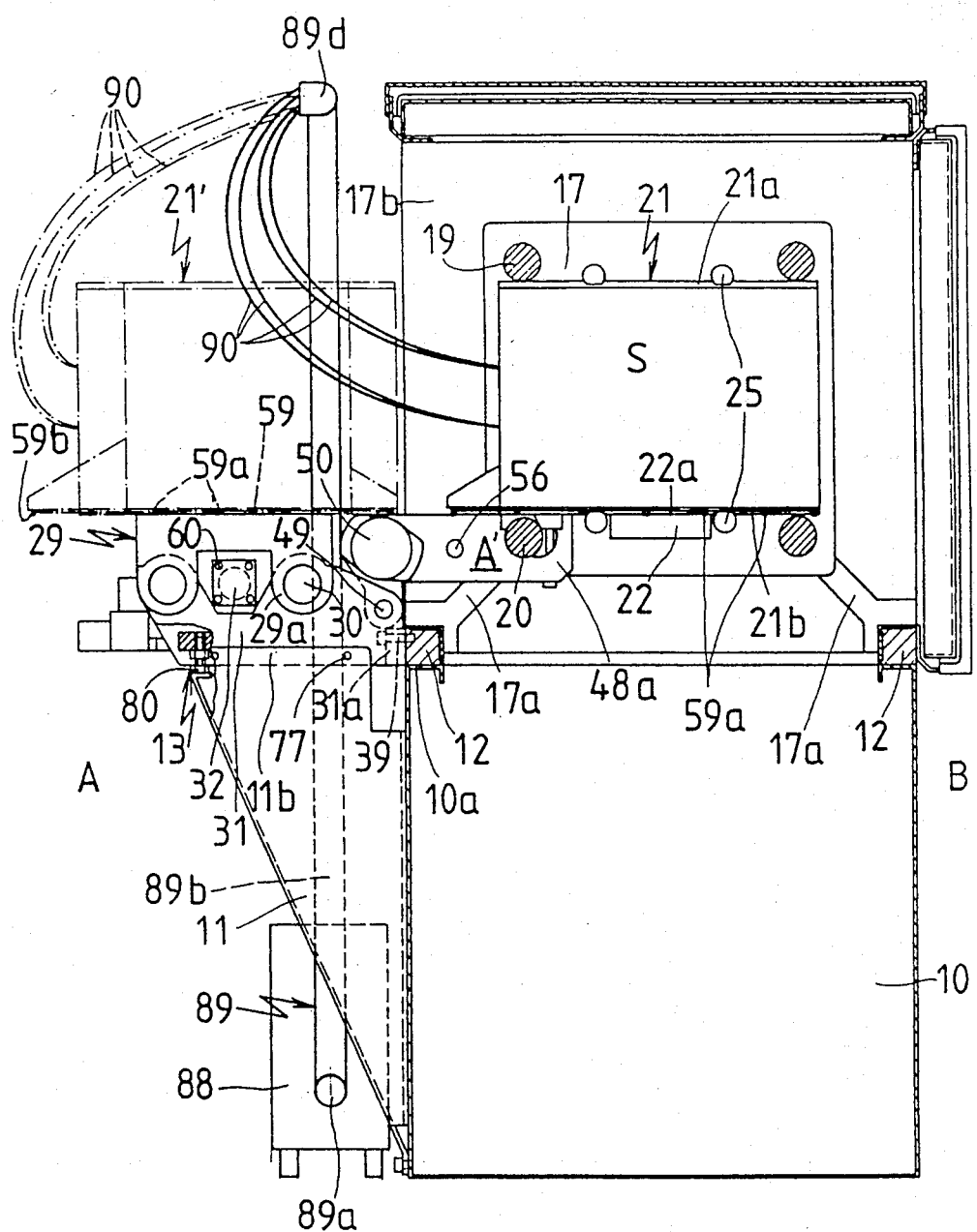
FIG. 1 shows, partially in a lateral elevational view and partially in a vertical transverse cross section, an injection molding machine with a horizontal die closing unit and a mold changing and mold preconditioning device representing a first embodiment of the invention.
Figure 2:
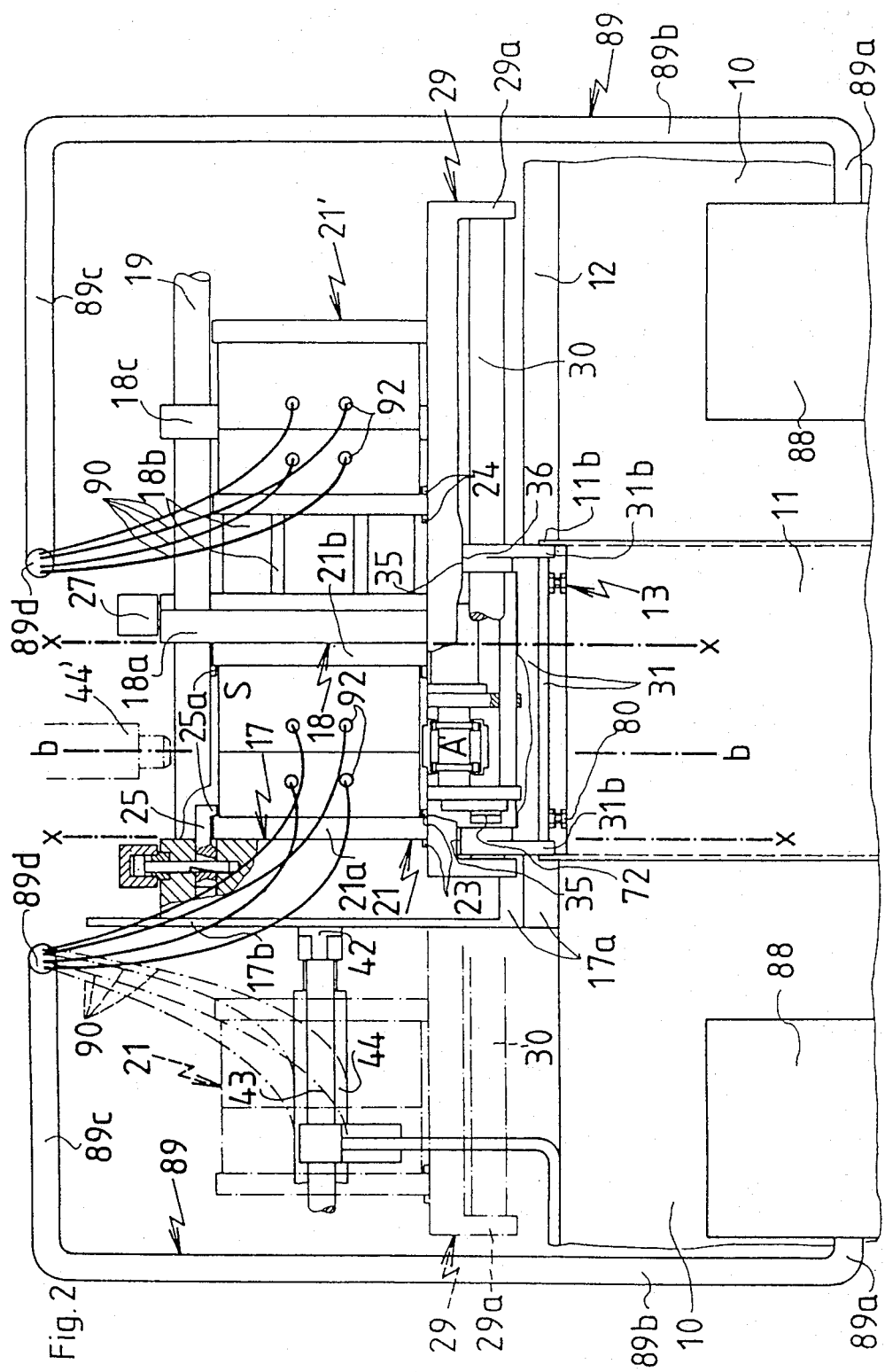
FIG. 2 shows the injection molding machine of FIG. 1 in an elevational view, distal parts of the die closing unit being not shown.

As can be seen in FIGS. 1 and 2 of the drawing, the injection molding machine incorporating the device of the present invention has a horizontal die closing unit which is supported by a machine base 10. The latter is a hollow, generally prismatic structure formed of welded sheet metal. The machine base 10 carries on its upper longitudinal edges two parallel guide rails 12 to which the die closing unit is attached.

Figure 3:
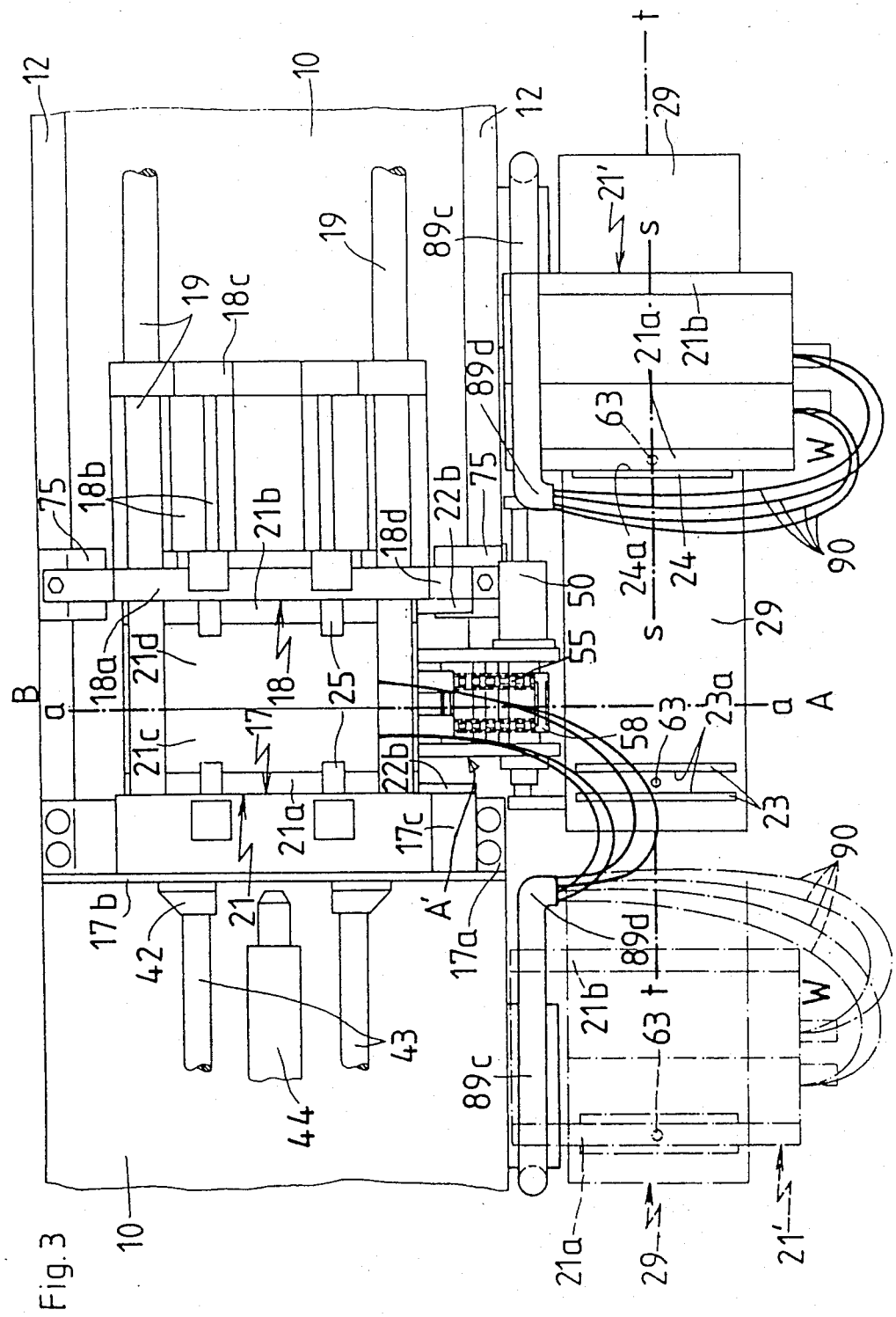
FIG. 3 shows the injection molding machine of FIGS. 1 and 2 in a plan view.

FIGS. 2 and 3 show that the die closing unit comprises a stationary die carrier member 17 and a movable die carrier member 18, the two die carrier members facing each other across the die clamping space S (FIG. 2). The machine base 10 also carries a stationary cylinder head plate, not shown, at a distance from the movable die carrier member 18. Two upper tie rods 19 and two lower tie rods 20 extend horizontally between the stationary die carrier member 17 and the earlier-mentioned cylinder head plate, thus forming a rigid stationary frame, while supporting and guiding the movable die carrier member 18 for die opening and die closing movements.

The stationary die carrier member 17 engages the two guide rails 12 of the machine base 10 by means of two diagonally extending mounting struts 17a. An enlarged reinforcing shield 17b forms a collar on the outer side of the die carrier member 17. The guide rails 12 are welded to angled horizontal flange portions 10a (FIG. 1) of the side walls of the machine base 10.

The movable die carrier member 18 is in the form of an open frame, having a die mounting wall 18a facing the clamping space S and a pressure transfer wall 18c on the axially opposite side, the two walls being connected by pressure transfer ribs 18b. A power cylinder, likewise not shown, is supported by the earlier-mentioned cylinder head plate. The horizontal piston rod of the cylinder assembly is attached to the center of the pressure transfer wall 18a. The movable die carrier member 18, in addition to being supported by the tie rods 19 and 20, may also engage the guide rails 12 with two special anti-friction guide assemblies 75.

On the back side of the stationary die carrier member 17 is arranged an injection unit (FIGS. 2 and 3) of which only the forward extremities of the plastification cylinder 44 and of two guide rods 43 are shown. The latter are attached to the die carrier member 17 by means of mounting sockets 42.

FIG. 2 also shows in stippled lines the forward extremity of a plastification cylinder 44', as part of an injection unit which is arranged to inject in the partition plane b—b of an injection molding die.

FIGS. 1-4 show an injection molding die or die assembly 21 being held in operating position in the die clamping space S, between the stationary and movable die carrier members 17 and 18, respectively. The die assembly 21 consists essentially of two die halves, engaging each other on opposite sides of a transverse die separation plane b—b. A second die assembly 21' is shown to be supported by a translation table 29, in a waiting position outside the die closing unit.

The stationary die half has on its outer side a back plate 21a, and the movable die half carries a similar back plate 21b. The second die assembly has identical back plates 21a' and 21b', respectively, although the axial depth of the die assembly 21' may differ from that of the die assembly 21, due to different depths of the injection cavities in the other die plates 21c and 21d, or 21c' and 21d', respectively.

While the cavity plates of a set of die assemblies may differ over a relatively wide range which is limited only by the maximum axial opening distance of the die closing unit, the back plates 21a and 21b of the various die assemblies are preferably of uniform size, at least uniform height. Another uniform feature of the die assemblies is that their back plates 21a and 21b protrude upwardly and downwardly over the other plates of the die assembly to form flange portions with horizontal lower end faces on which the die assembly is supported. At least the lower flange portion of the back plate of the stationary die half also has parallel vertical guide faces.

In the operating position, the die halves of the die assembly are clamped against their associated die carrier members 17 and 18 by means of two pairs of clamping plungers 25 (FIGS. 2 and 3) which are guided in horizontal bores of the die carrier members. The clamping plungers 25 have hook-like clamping noses 25a engaging the inner sides of the upper and lower flange portions of the back plates 21a and 21b. The clamping movements of the clamping plungers 25 are produced by transversely arranged hydraulic cylinders 27 with piston rods having a wedge taper in engagement with the clamping plungers 25 (FIG. 2). Further details of these clamping devices are disclosed in my copending U.S. patent application Ser. No. 449,550, filed Dec. 13, 1982.

As can best be seen in FIG. 3, the translation table 29 has on its upper side two die emplacements which are adapted to carry two die assemblies at the same level at which a die assembly is held in its operating position in the clamping space S of the die closing unit. The longitudinal distance between the two die emplacements is such that two die assemblies of maximum axial depth can be accommodated side-by-side on the translation table 29.

The transfer of a die assembly from the translation table 29 to the clamping space S takes place along a rectangular horizontal path which is composed of a longitudinal translation path t—t of a length which corresponds to the distance between the two die emplacements, and a transverse transfer path a—a (FIG. 3) of a length which corresponds to the distance between the central transfer position and the operating position.

The translation table 29 which executes the translation movement is supported on a stationary supporting frame 31, engaging guide bores of the latter with two horizontal guide rods 30 (FIG. 2). The guide bores are arranged in vertical transverse wall members 31b on the longitudinal extremities of the supporting frame 31. The extremities of the guide rods 30 are attached to two downwardly offset attachment lugs 29a at both extremities of the translation table 29.

As can be seen in FIGS. 1 and 2, the wall members 31b of the supporting frame 31 terminate in lateral mounting legs 31a which are clamped to the outer sides of the near guide rail 12 by means of bolts 39. A sheet metal bracket 11 serves to stabilize the cantilever-type attachment of the supporting frame 31 on the machine base 10. The bracket 11 has a generally triangular outline.

The supporting frame 31 supports itself on the bracket 11 by means of two leveling devices 13 which consist of leveling bolts 80 engaging threaded bores of the frame 31 and pressing with their heads against a horizontal face of the bracket 11. Counter-nuts 88a secure the adjustment setting. The transverse side walls 11b of the bracket 11 reach upwardly into the area of the transverse wall members 31b of the frame 31, where they are attached to the latter by means of screws 77 (FIG. 1). The leveling devices 13 make it possible to adjust the height of the translation table 29 for a precise horizontal alignment of the level of the die emplacements with the level at which the die assembly is supported in the die closing unit.

The translation movement is obtained by means of a hydraulic cylinder assembly 32 (FIG. 1) which is attached to a transverse wall member 31b of the frame 31 (FIG. 2). The piston rod (not shown) of the cylinder assembly 32 is attached to the translation table 29 on the same side on which the cylinder assembly is attached to the supporting frame 31. The cylinder assembly 32 extends parallel to and between the two guide rods 30 of the translation table 29.

On the underside of the translation table 29 is arranged a bearing face 35 which, in the right-hand position of table 29 (FIG. 2), cooperates with a support surface 36 on the upper side of the right-hand transverse wall member 31b of the supporting frame 31 to relieve the guide rods 30. In the left-hand position of the table 29 (stippled lines), the bearing face 35 cooperates with a corresponding support surface on the left-hand transverse wall member 31b.

As can best be seen in FIG. 3, the two die emplacements on the translation table 29 have each a pair of guide ledges 23 and 24, respectively, attached to the top surface of the translation table 29. The two pairs of guide ledges form guide channels with opposing guide faces 23a and 24a, respectively. Into each guide channel fits the lower flange portion of the back plate 21a (or 21a') of the stationary die half of a die assembly (FIG. 2). The back plate 21b (or 21b') of the movable die half rests freely on the translation table 29; its position on the table may vary, depending on the axial depth of the die assembly.

The distance between the two guide channels is equal to the distance of the translation movement, so that, when the translation table 29 moves to the left, into the position shown in FIGS. 2 and 3 by stippled lines, the guide ledges 24 come to occupy the position previously occupied by the guide ledges 23. This central position is the transfer position. Accordingly, the left-hand die emplacement, shown in the drawing to coincide with the transfer position, shuttles between the latter and a waiting position to the left thereof, and the right-hand die emplacement shuttles between the transfer position and a waiting position to the right thereof.

The guide ledges 23a of the die emplacement in transfer position are so arranged that the guide face 23a which cooperates with the outer face of the back plate 21a is aligned with the die mounting face of the stationary die carrier member 17, so that the back plate of a die assembly 21 in transfer from the transfer position to the operating position slides past said mounting face with minimal clearance.

For this purpose, the stationary die carrier member 17 has attached to its lower part a guide shelf 22 (FIG. 1) with a horizontal guide face 22a in alignment with the top surface of the translation table 29. Between the table 29 and the guide shelf 22 is further arranged an intermediate guide member 22b (FIG. 3) which is attached to a lateral extension 17c of the die carrier member 17. During the transfer movement of the die assembly into the die closing unit, the lower end face of the back plate 21a thus slides from the translation table 29 onto the intermediate guide member 22b and from there onto the guide shelf 22.

The back plate 21b of the movable die half of the die assembly 21, being slidable on the translation table 29 without guidance in the axial sense of the die closing unit, is similarly supported by a guide shelf (not shown) on the movable die carrier member 18 which also has a lateral extension 18d carrying an intermediate guide member 22b (FIG. 3).

The controls of the injection molding machine are so programmed that, prior to the transfer of a die assembly from the transfer position on the translation table to the operating position in the die closing unit, the movable die carrier member 18 is positioned a minimal distance short of the closed position for the particular die assembly. A corresponding minimal die opening stroke is necessary for the transfer of a die assembly from the die closing unit onto the translation table. This opening stroke is preferably in the order of 1 mm or less.

The transfer of a die closing unit from the translation table into the die closing unit with a minimal opening of the latter is made possible through the use of the earlier-mentioned horizontal clamping plungers 25 whose clamping noses 25a (FIG. 2) engage the inwardly facing sides of the back plates 21a and 21b of the die assembly. The clamping plungers 25 execute a horizontal release movement which is greater than the minimal opening stroke, so that, during the transfer movement of the die assembly 21, they are clear of the path of the back plates.

The transfer movement is obtained by means of a transfer drive assembly A' which is arranged underneath the level of the translation table 29 and guide shelf 22 and which consists essentially of two parallel endless roller chains 55 (FIG. 2) forming a straight driving run just underneath the die assembly, so that transversely oriented drive bars 58 carried by the two roller chains 55 engage a drive rack 59 on the underside of the die assembly.

A hydraulic motor 50 provides the power for the transfer drive. The shafts and sprockets supporting the chains 55 are journalled in a cradle 48a (FIG. 1) which is adjustably clamped to one of the lower tie rods 20 and also supported on a parallel supporting rod 49. The axial position of the transfer drive assembly A' is adjustable by resetting the cradle 48a on the rods 20 and 49.

In each die emplacement is further provided a vertically guided restraining pin 63 (FIG. 3) which is arranged to engage the back plate 21a (or 21a') of a die assembly from underneath, so as to block the latter against accidental displacements in the transverse direction. As soon as a die emplacement approaches the central transfer position, its restraining pin 63 is retracted downwardly by a slide member with cam faces (not shown), thereby freeing the die assembly on this die emplacement for a transfer movement.

As can be seen in FIGS. 1 and 2, the device of the invention includes two temperature conditioning units 88 which are mounted against the longitudinal side wall of the machine base 10, underneath the translation table 29. A first set of conditioning fluid supply lines 90 leads from the left-hand temperature conditioning unit 88 to the die assembly 21 in operating position in the die closing unit, and a second set of conditioning fluid supply lines 90 leads from the right-hand temperature conditioning unit 88 to the die assembly 21' in the right-hand die emplacement in waiting position on the translation table 29.

The two sets of supply lines 90 consist of flexible hoses, a major portion of the length of each set being encased within a harness pipe 89 which is attached to the base of its temperature conditioning unit 88. Both harness pipes 89 have lower horizontal length portions 89a followed by vertical length portions 89b and upper horizontal length portions 89c, each terminating in a mouth 89d.

As can be seen in FIGS. 1 and 2, the mouths 89d of the two harness pipes 89 are located above and approximately halfway between the operating position and the assigned waiting position of the die assembly, so that the free flexible length portion of each set of supply lines 90 forms a gently curving depending arc between the pipe mouth 89d and the die assembly. These flexible length portions thus make it possible for the conditioning fluid supply lines 90 to remain connected to the die assembly, while the latter is moved between its operating position and its assigned waiting position, and vice versa, as indicated in the drawing by full lines and stippled lines, respectively.

In a changeover from a production run with one die assembly to a production run with another die assembly, the device of the invention operates as follows:

The injection molding machine of FIGS. 1 and 3 shows a production configuration in which parts are produced with the die assembly 21 in the die closing unit. This die assembly is linked to the left-hand temperature conditioning unit 88 which maintains the required temperature gradient inside the injection molding die. Included with the set of flexible supply lines 90 are electrical lines (not shown) which feed temperature data and, if necessary, control pulses to and from the die assembly.

A second die assembly 21' is in a waiting position, resting on the right-hand die emplacement of the translation table 29. Its die halves are connected to the right-hand temperature conditioning unit 88. Conditioning of the die assembly 21' in waiting position is started so far in advance of changeover that, at the time of changeover, the die assembly 21' is fully conditioned, i.e., with the proper temperature gradient established and all operating connections in place, so that, at the time of changeover, the new die assembly 22' is ready for immediate parts production . For certain injection molding dies, temperature conditioning may have to start two hours or more in advance of changeover. Accordingly, while the temperature conditioning units 88 alternate in service during successive production runs, both units are in operation during the preconditioning phase.

The changeover procedure is preferably controlled by a preestablished automatic operating program which starts with the shutdown of the production cycle and the shutdown of the left-hand temperature conditioning unit 88. The die exchange begins with the relaxation of the clamping plungers 25, thereby releasing the die halves from the die carrier members 17 and 18, followed by a minimal opening movement of the movable die carrier member 18.

Next, the transfer drive assembly A' pushes the die assembly 21 over the guide members 22 and 22b into the transfer position on the translation table 29, whereupon the latter is moved from right to left, to bring the waiting die assembly 21' into the transfer position and the previously used die assembly 21 into the left-hand waiting position (shown in stippled lines). A reverse movement of the transfer drive then pushes the die assembly 21' into the operating position between the die carrier members 17 and 18, whereupon the movable member 18 is closed against the die assembly, and the clamping plungers 25 are actuated. The machine is now ready for a new production run.

With the empty left-hand die emplacement in transfer position at the beginning of the changeover, its restraining pin 63 remains retracted, until the translation table 29 begins to move. At that point, however, the die emplacement carries the removed die assembly 21, so that the upwardly moving pin 63 enters a notch in the back plate 21a of the die assembly, securing it on the translation table 29. At the end of the die exchange procedure, the previously used die assembly 21 is disconnected from its conditioning supply lines and lifted off the translation table 29.

The new die assembly 21' may have an axial depth which differs from that of the previously used die assembly 21. In this case, it is necessary for the movable die carrier member 18 to execute a compensatory movement equal to the difference in depths of the two die assemblies. This compensatory move takes place in the time span between the removal transfer movement and the insertion transfer movement.

The new production run may also require a changeover from one injection unit to another, when different raw materials are required, for example. In this case, the conditioning time for the changeover of injection units can be similarly overlapped with the preceding production run, if the succession of die assemblies is so arranged that the waiting die assembly is one which is injected in a different direction from the direction in which the currently used die assembly is injected. This makes it possible to install the new injection unit in advance, to charge the raw material hopper, and to start temperature conditioning of the plastification cylinder in advance, so that the new injection unit is likewise fully preconditioned at the time of changeover to the next production run.

FIGS. 4 through 10 show a second embodiment of the invention. This embodiment features a different transfer drive assembly A" (FIG. 5) which, unlike the transfer drive assembly A' of the previously described embodiment, utilized a single endless roller chain 55' which circulates around an oblong horizontal path defined by two sprockets on vertical shafts. This transfer drive assembly is described in more detail in my copending U.S. patent application Ser. No. 506,025, filed June 20, 1983, now U.S. Pat. No. 4,462,783. The disclosure of this application is to be considered incorporated herein by reference.

In the transfer drive assembly A" of this embodiment, the cradle 48a and the supporting rod 49 are no longer necessary, the vertical shafts and the hydraulic drive motor 50 (FIG. 4) being supported directly by the guide shelf 96 of the stationary die carrier member 17. The endless roller chain 55' carries regularly spaced upwardly protruding drive pins 55a which cooperate with matching drive recesses 94b of a drive rack 94.

Unlike in the previously described embodiment, where each die assembly has its own drive rack attached to its underside, this embodiment requires only two drive racks 94, one for each die emplacement on the translation table 29. The two drive racks 94 thus remain captive with the two die emplacements, being guided independently of and alongside the back plates 21a of the die assembly 21. For this purpose, the two die emplacements on the translation table 29 have additional guide ledges 23t to the right of the guide ledges 23 and 24, respectively, and the guide shelf 96 on the die carrier member 17 has an additional guide groove.

The arrangement of captive drive racks in the die emplacements makes it advantageous to modify the restraining pins 63 in such a way that they engage the drive racks 94, rather than the back plates 21a of the die assemblies, as is the case in the first embodiment. The function of the modified restraining pins 94 is unchanged, viz. to block each drive rack 94 against transfer displacements in all positions of its emplacement, except when the latter coincides with the transfer position.

The guide channels for the drive racks 94 also include vertical restraints for the drive racks, so that, when a die assembly is lifted off the translation table 29, the drive rack is held back in the die emplacements. The drive racks 94 also have upwardly extending entrainment pins 94a, and each die assembly has matching entrainment bores, for the automatic establishment of a simple drive connection between the die assembly 21 and the drive rack 94, when the die assembly is lowered onto the die emplacement.

The embodiment of FIGS. 4 through 10 also has modified conditioning supply lines 90 linking the two temperature conditioning units 88 (FIG. 6) to the two die assemblies. The flexible length portions of the two sets of supply lines are no longer beginning at two fixed points above the translation table 29, as in FIG. 2, depending from these points, when not connected to a die assembly. Instead, the terminating ends of the two sets of supply lines 90 are permanently connected to two coupling heads 93 which are associated with the two die emplacements.

Actually, the coupling heads 93 are attached to the two drive racks 94 and are thus likewise captive, but transversely movable in relation to the die emplacement. This makes it possible to run the flexible length portions of the supply lines 90 directly from the temperature conditioning units 88 to the upper side of the translation table 29 and to attach their extremities to the coupling heads 93.

Figure 6:
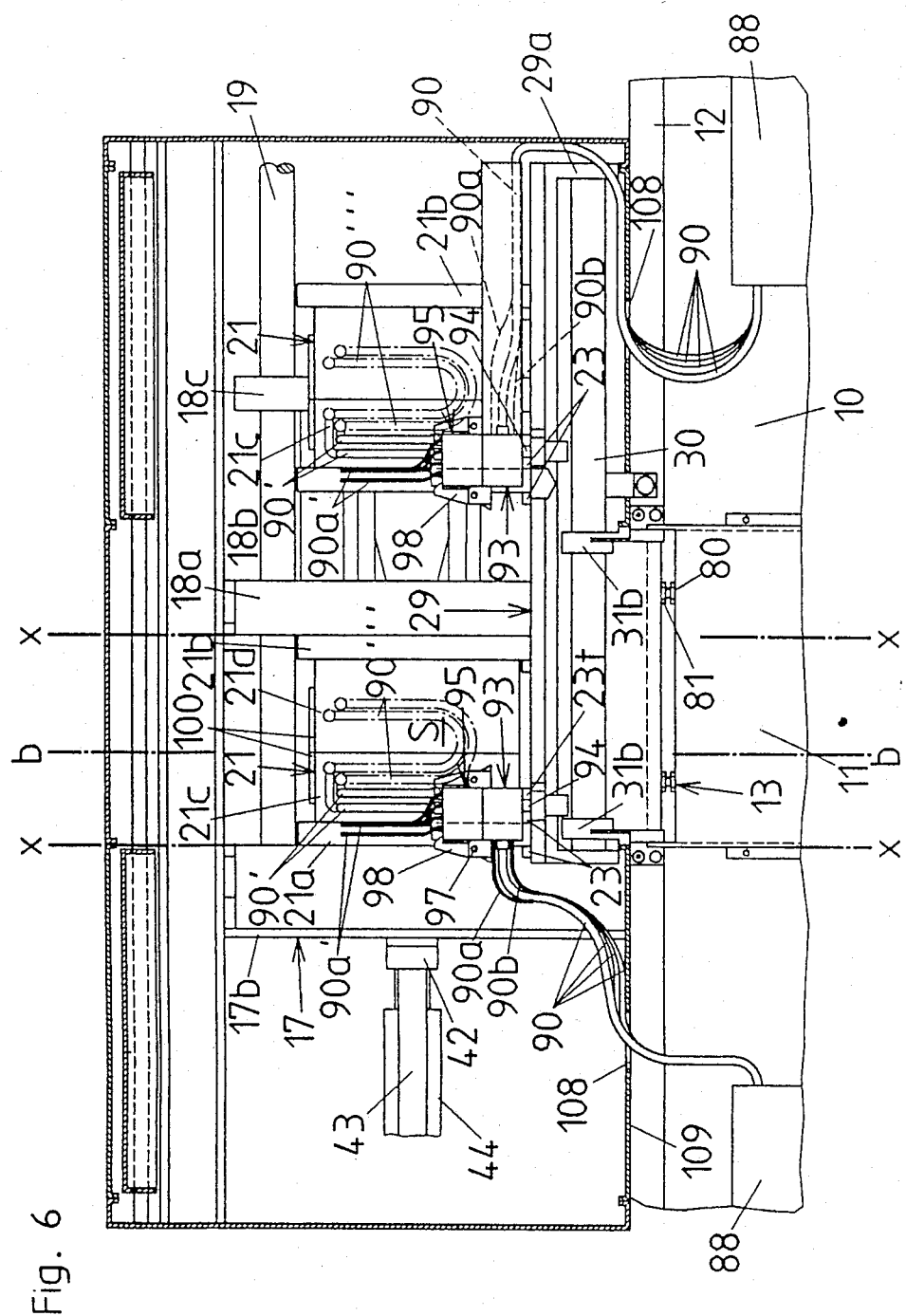
FIG. 6 shows the injection molding machine of FIGS. 4 and 5 in an elevation comparable to FIG. 2.

FIG. 6 shows the spatial arrangement of the two sets of supply lines 90, to which are joined additional lines 90a and 90b. Each line bundle runs upwardly from its temperature conditioning unit 88, through an opening 108 in the bottom wall of a sheet metal covering 109, and around the longitudinal extremity of the translation table 29, to the axially outer side of the block-shaped coupling head 93.

Figure 5:
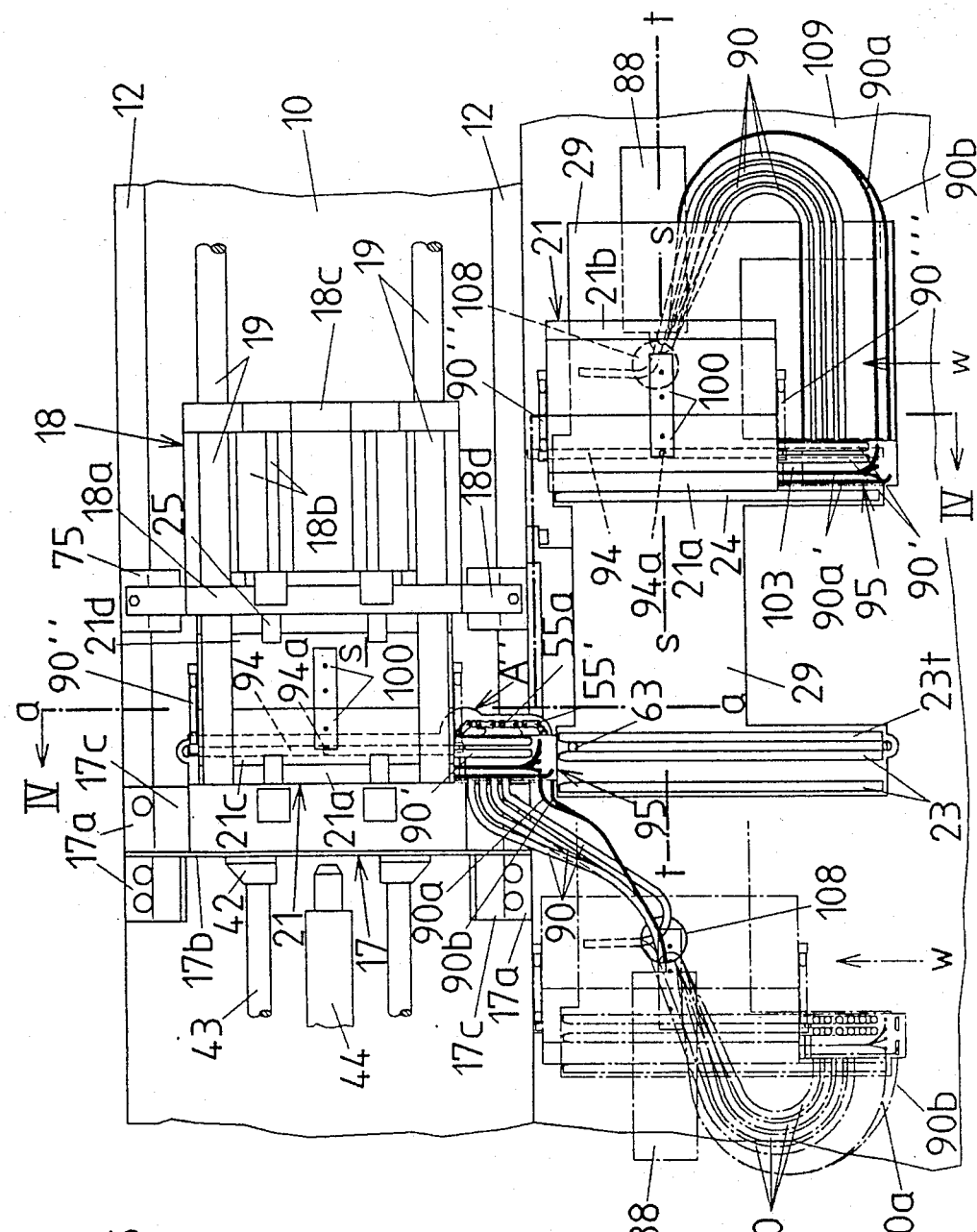
FIG. 5 shows the injection molding machine of FIG. 4 in a plan view comparable to FIG. 3.

The longitudinal movements of the translation table 29 are accommodated by a loop portion which brings the line bundle 90 to the upper side of the table 29. The die emplacement which is in the transfer position does not require such a loop, so that the corresponding length portion of available supply line conveniently accommodates the transfer movement, as is shown in FIG. 5.

Figure 9:
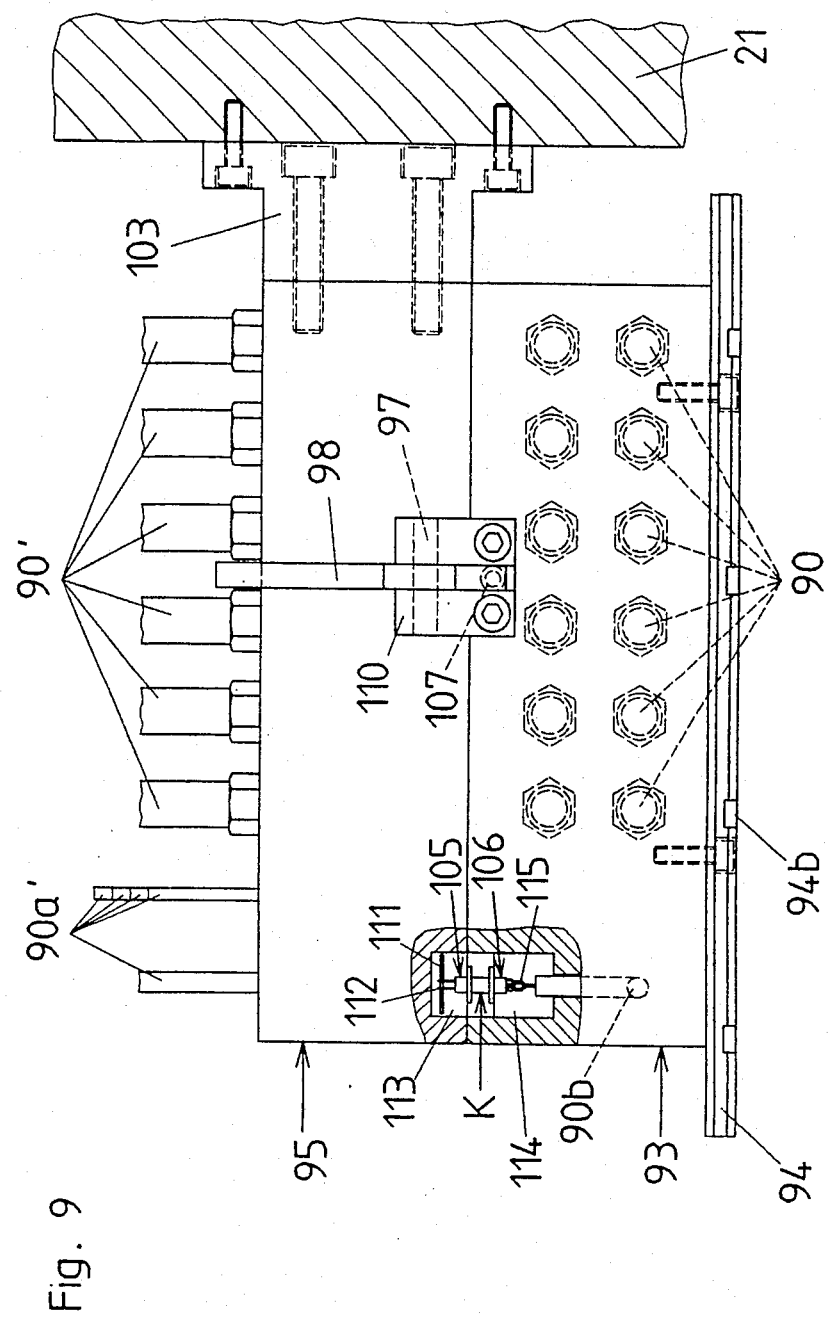
FIG. 9 shows the coupling heads of FIG. 7 in a side view, as an enlarged detail of FIG. 4.

As can be seen in FIGS. 7–9, the die assembly 21 carries a coupling head 95 which cooperates with the coupling head 93 of the drive rack 94 to establish the various supply line connections. For this purpose, the two coupling heads are equipped with banks of coupling valves 104 in vertical alignment with one another. These coupling valves are known, standardized components.

Aligned pairs of coupling valves 104 in the two coupling heads cooperate to automatically open each other, when the coupling heads enter into coupling engagement (FIG. 7), as the coupling head 95 of the die assembly is lowered onto the coupling head 93 of the drive rack. Inversely, the upward removal of the die assembly with its attached coupling head 95 brings about the automatic separation and shutoff of all the supply lines, as the coupling valves close under spring pressure.

FIGS. 7–9 show that the terminal end portions of the conditioning fluid supply lines 90 are located just above the translation table 29 and permanently attached to the coupling head 93, on its outer axial side. In the coupling head 95 of the die assembly 21, the coupling valves 104 lead to corresponding connecting lines 90' which feed the conditioning fluids to the two halves of the die assembly 21. Some of these lines may carry a pressure medium, oil or air, for the performance of specific operations in the injection molding process, such as the jet-ejection of injection-molded parts from the open die, or the unscrewing of threaded cores, for example. Other lines 90a' may be of the electrical type, carrying temperature measurement data and other feedback information from temperature sensors, end switches, and the like. They may also supply electrical current to resistive heating elements in the injection molding die.

With the exception of air hoses, all fluid supply lines are actually pairs of lines, i.e. a first line supplying the fluid to the die assembly, and a second line returning the fluid to the source. Each half of the die assembly may have its own pair, or pairs, of supply lines 90 and corresponding connecting lines 90'. Similarly, a die assembly with a metallic core may have a separate pair of conditioning fluid supply lines connected to the core. An arrangement of separate pairs of line connections 92 is visible in FIG. 2, for example.

There are different ways in which conditioning fluid can be supplied to the movable half of the die assembly 21. In one configuration, shown in FIGS. 4–6, and indicated by stippled lines in FIG. 6, a fluid supplying connecting line 90' is attached to the proximate end face of the stationary die half, from where a flexible connecting line 90''' in the shape of a "U" leads to an entry connection on the proximate end face of the movable die half. The used conditioning fluid exits through an adjacent connection from which a similar U-shaped flexible connecting line 90''' leads back to the end face of the stationary die half. A second connecting line 90' between the coupling head 95 and the stationary die half completes the circuit.

In another supply line configuration, two U-shaped flexible connecting lines 90'', similar to the lines described above, are connected to the distal end faces of the two die halves, and the connecting lines 90' lead from the coupling head 95 transversely through the stationary die half to the distal end face of the latter.

In a third possible arrangement of the supply lines, one of the two U-shaped flexible connecting lines 90' is connected to the proximate end faces of the two die halves, and the other flexible connecting line 90'' is connected to their distal end faces. In this case, only one of the two lines has to traverse the stationary die half of the die assembly.

Successive injection molding dies may exhibit differences in their transverse width, in addition to the earlier-mentioned differences in their axial depth. Two such die assemblies of unequal transverse width are shown in FIG. 5, where the die assembly in the right-hand waiting position is narrower than the die assembly in operating position, as indicated by the stippled lines showing it in the left-hand waiting position.

Because of the need for the drive racks 94 to be capable of cooperating with all die assemblies, their coupling heads 93 have to be located in a fixed position in relation to the axial center line of each die assembly. The center line of a die assembly is that line which coincides with the center line of the die closing unit, when the die assembly is in the operating position.

Figure 4:
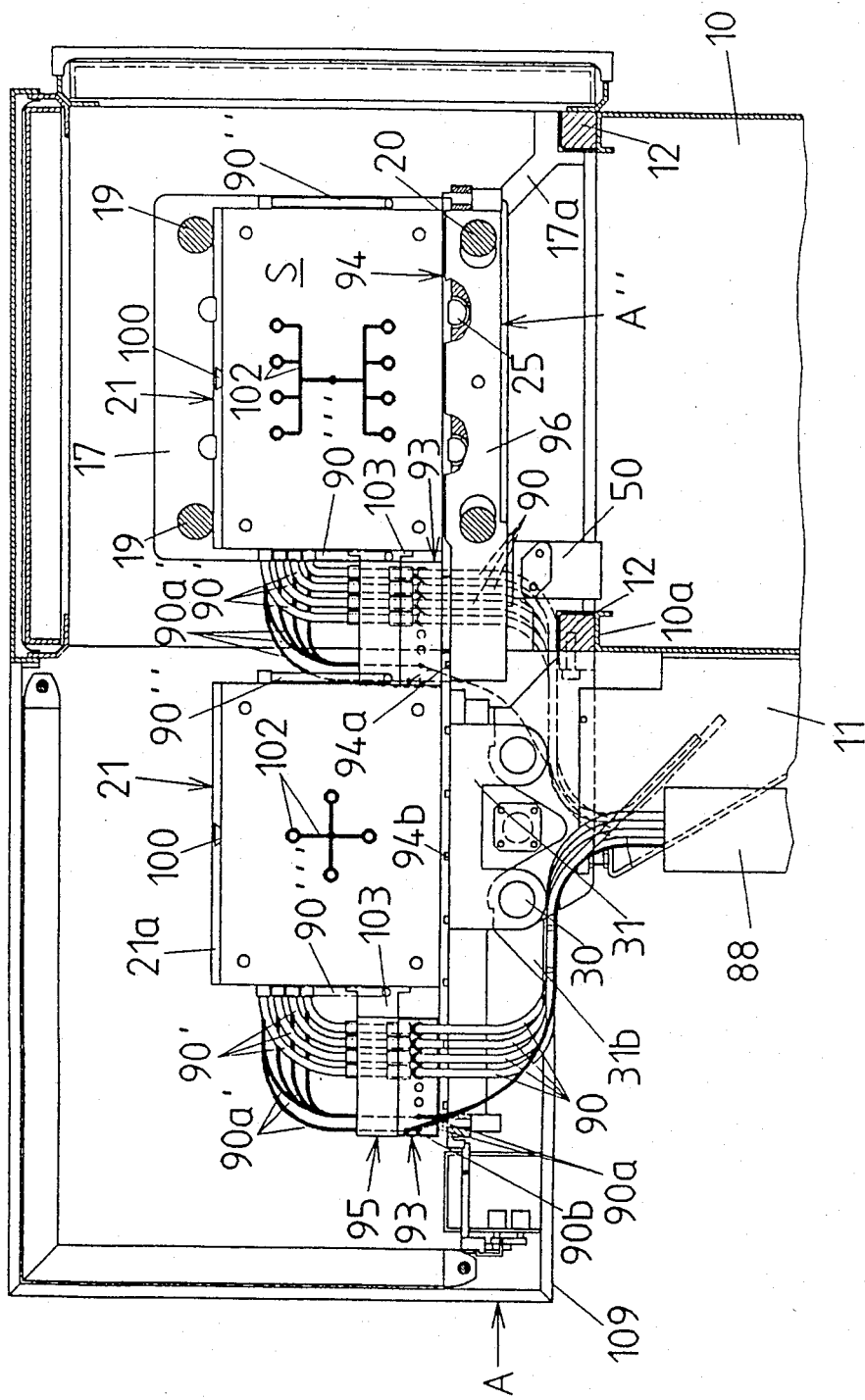
FIG. 4 is comparable to FIG. 1, representing a cross section taken along lines IV—IV of FIG. 5, and showing a second embodiment of the invention.

The consistent positioning of the coupling heads 93 on the two drive racks 94 is achieved by means of the earlier-mentioned restraining pins 63 which block the drive racks 94 against transverse movements, except when they are in the transfer position. The coupling head 95 of a die assembly is attached to the proximate end face of its stationary die half with the aid of a supporting bracket. Because of the differences in transverse width of successive die assemblies, this supporting bracket must be correspondingly wider or narrower. A comparatively wide supporting bracket 103 is shown in FIG. 9 and also in FIG. 4, on the end face of the die assembly in waiting position. A comparatively narrow supporting bracket 103' is shown in FIG. 4, on the end face of the die assembly in operating position.

The first embodiment of the invention, as exemplified by FIGS. 1-3, provides for the die assemblies to simply rest on their die emplacements, engagement with the transfer guides and with the transfer drive chain being maintained by gravity. In the second embodiment of FIGS. 4-10, on the other hand, the weight of a die assembly may not be sufficient to safely hold the two coupling heads 93 and 95 together. The reaction forces of the coupling valve springs and the hydraulic effect of pressure in some of the supply lines 90 may combine to produce a considerable lifting force on the upper coupling head 95. In order to neutralize this lifting force—as well as a corresponding downward pressure against the drive rack 94 and against the guides—the lower coupling head 93 carries a pair of retaining latches 98, arranged on opposite axial sides (FIGS. 7-9).

The latches 98 have noses reaching over the upper coupling head 95 in engaged position, under the influence of compression springs 107. The upper extremities of the retaining latches 98 have inclined faces which cooperate with the flanks of a downwardly advancing upper coupling head 95 to separate the latches and to produce a snap-type engagement, when the die assembly is lowered onto a die emplacement.

The disengagement of the upper coupling 95 head from the lower coupling head 93, in the course of the removal of a die assembly from its die emplacement, requires the forcible separation of the two retaining latches 98. Such a latch releasing action can be achieved by means of a special hoisting device which is equipped with a pair of vertically downwardly extending release members 101 (FIG. 8). Alternatively, one of the coupling heads may be equipped with a release mechanism operated by means of a small hydraulic or pneumatic cylinder assembly.

Lastly, the invention also makes is possible to automatically identify each die assembly. This is accomplished by means of a code identification device K in the form of cooperating male and female multi-conductor plug connections in the two coupling heads 93 and 95 (FIGS. 9 and 10). A line 90b serves to read the identification code of the die assembly, feeding it to the control computer of the injection molding machine.

The connecting line 90b is a multi-conductor cable which terminates at a female connector 106. The latter is arranged inside a recess 114 of the lower coupling head 93, being held in place by screws which engage an enlarged anchoring plate 106a of the connector 106. A matching male connector 105 is arranged inside a recess 113 of the upper coupling head 95, being similarly held in place by screws which engage its anchoring plate 105a.

The male connector 105 carries two rows of connector pins 112 which engage two matching rows of female contacts in the female connector 106. The connector pins 112 extend upwardly from the back side of the male connector 105, where they carry a code plate 111 at a distance from the latter.

The code plate 111 is shown in FIGS. 10a through 10d in four examples of different code patterns. The basic code plate 111 has a pattern of printed leads linking the two rows of connector pins 112 to two longitudinal collection leads 111a. Each contact point 111c of the code plate 111 is connected to one of the two collection leads 111a over a short branch lead 111b.

A particular code pattern is established by severing one or more of the branch leads 111b, at selected contact points 111c, as is shown in the drawing. At the first connector pin is the lead-in contact point 111d to which a read voltage is applied through the connecting line 90b. The control computer of the injection molding machine reads the code pattern of the particular die assembly by determining and recording the location and number of those conductors 105 of the multi-conductor connecting line 90b which, when the read voltage is applied to the lead-in contact point 111d, do not carry a response voltage.

The code plate 111 is simply inserted over the contact pins 112, being held in place by friction. Accordingly, the code plate 111 is effortlessly removable from the male connector 105, for the inscription of a code, or for replacement with a differently coded plate, should the code have to be changed. The ease with which the code can be produced and the large number of different code patterns available make it possible for the user of such an injection molding machine to establish an in-house code system, in accordance with the specific identification requirements and production setup employed by the user.

The use of an identification code which is machine-readable is particularly advantageous in connection with a fully automated program-controlled procedure for the exchange of injection molding dies and the preconditioning of die assemblies. The program may even extend to the automatic retrieval of the called-for die assembly from its place of storage and to the automatic deposition of the die assembly in the free die emplacement on the translation table 29. Each die assembly has for this purpose on its upper side a hoisting bar 100 (FIGS. 4 and 5) for engagement by an overhead conveying device.

The lowering of the retrieved die assembly onto the empty die emplacement of the translation table automatically establishes connection between the coupling heads 93 and 95, so that the computer can read the code of the die assembly and retrieve from its program memory the preconditioning information which applies to this die assembly. Later, after the fully preconditioned die assembly has been transferred and attached to the die carrier members of the die closing unit, the computer also supplies the variable operating parameters of the production run.

It should be understood, of course, that the foregoing disclosure describes only preferred embodiments of the invention and that it is intended to cover all changes and modifications of this example of the invention which fall within the scope of the appended claims.

I claim the following:

1. In an injection molding machine which includes a plurality of interchangeable injection molding dies and is equipped with die temperature conditioning means, including means for circulating conditioning fluid and for controlling the temperature of the conditioning fluid, which machine further includes a machine base carrying a horizontally oriented die closing unit with a stationary die carrier member, a movable die carrier member, and a drive assembly producing horizontal die opening and die closing movements along the longitudinal center axis of the die closing unit, and wherein the stationary and movable die carrier members have parallel vertical die mounting faces and include means for releasably clamping to said die mounting faces the two halves of a succession of said injection molding dies which, for this purpose, have standardized oversize back plates which are engageable by said clamping means; in such a machine, a device for mechanically exchanging injection molding die assemblies in the die closing unit and for preconditioning a die assembly in an assigned waiting position, prior to insertion into said die-closing unit, while another die assembly remains in service, in its normal operating position between the die carrier members, the device comprising in combination:

a translation table arranged alongside the die closing unit, the translation table defining two die emplacements equidistant from the center axis of the die closing unit, for the support of two die assemblies in waiting position at the same level at which a die assembly is held in its operating position, the translation table being movable horizontally, so that either of the two die emplacements can be brought to coincide with a transfer position in transverse horizontal alignment with the operating position of the die assembly;

a translation drive connected to the translation table for the creation of translational movements of the translation table;

means defined by each of the two die emplacements on the translation table for guiding a die assembly for horizontal transfer movements at right angles to the center axis;

means defined by the stationary and movable die carrier members for supporting a die assembly in its operating position between said die carrier members, when not attached to the mounting faces of said members, and for guiding said die assembly for horizontal transfer movements at right angles to the center axis;

a transfer drive engageable with a die assembly in said die emplacement coincident with the transfer position, so as to entrain said die assembly in a transfer movement between the transfer position and the operating position;

two separate sets of conditioning fluid lines associated with the two die emplacements on the translation table, each set of conditioning fluid supply lines being adapted to connect a die assembly in waiting position to said temperature conditioning means; and wherein each die emplacement has its guide means so arranged that, in the transfer position, said die emplacement cooperates with the support and guide means of the two die carrier members to define a substantially continuous straight-line transfer path for the die assembly between the transfer position and the operating position;

the lines of each set of supply lines have flexible length portions terminating in line couplings by which said lines are releasably connectable to a die assembly; and the flexible length portions of each set of supply lines begin at a point in space which is so positioned in relation to the operating position and the waiting position defined by the associated die emplacement that the lines of each set of supply lines, when connected to a die assembly, accommodate the movements of said die assembly between its waiting position and the operating position, remaining connected for fluid circulation in both positions and during movement therebetween.

2. A device as defined in claim 1, wherein
the translation table includes a pair of horizontal parallel tie rods with which said table engages a stationary supporting frame for movement guidance;

the translation drive is in the form of a hydraulic cylinder assembly; and the translation movement created by the translation drive is equal in length to the distance between the two die emplacements on the translation table.

3. A device as defined in claim 1, wherein
the transfer drive is located generally underneath the space occupied by a stationary die carrier member and is supported by a stationary part of the die closing unit; and the transfer drive includes a drive assembly with revolving drive elements cooperating with a row of regularly spaced drive recesses of a member of the die assembly in a rack-and-pinion-type drive configuration.

4. A device as defined in claim 3, wherein
the transfer drive includes a roller chain drive with an endless roller chain moving along an oblong path of which one straight run is a driving run, extending parallel to the transfer path of the die assembly, the driving run of the roller chain being defined by a drive sprocket and a return sprocket on transversely spaced shafts;

the revolving drive elements are drive protrusions extending vertically from the driving run of the roller chain; and the transfer drive further includes a drive motor which is connected to the shaft supporting the drive sprocket.

5. A device as defined in claim 4, wherein
said die assembly member with the spaced drive recesses is a drive rack which is arranged on the underside of the die assembly and which transmits to said die assembly the movements of the driving run of the revolving roller chain; and at least the first drive recess of the drive rack is in the form of a transverse groove on the underside of the drive rack into and out of which the nearest drive protrusion of the roller chain is movable in both longitudinal directions, when a die assembly on the translation table approaches or leaves the transfer position.

6. A device as defined in claim 4, wherein
said die assembly member with the spaced drive recesses is a drive rack which is removably connectable to the underside of a die assembly in a die emplacement, transmitting to said die assembly the movements of the driving run of the revolving roller chain;

the drive rack is connectable to a succession of different die assemblies which include standardized rack connecting elements, each of the two die emplacements on the translation table having a separate drive rack associated therewith;

each die emplacement further defines means for independently guiding associated drive rack for movements parallel to said die transfer path; and the die closing unit defines similar means for independently guiding the drive rack for movements parallel to said die transfer path, in alignment with the rack guide means of the die emplacement in transfer position.

7. A device as defined in claim 6, wherein each drive rack is vertically restrained by its guide means, so as to remain in place on the translation table, when a die assembly is lifted off its die emplacement on the translation table, the drive rack thereby being disconnected from the die assembly;

each drive rack carries a plurality of upwardly extending entrainment pins; and said standardized rack connecting elements of the die assemblies are in the form of vertical bores on the underside of each die assembly which are engageable by the entrainment pins of a drive rack.

8. A device as defined in claim 6, wherein the translation table further includes, associated with its two die emplacements, means for restraining the transfer movements of any die assembly in a die emplacement which is not in alignment with the transfer position.

9. A device as defined in claim 1, wherein the transfer drive is supported by the die closing unit and includes a drive assembly with revolving drive elements arranged generally between and underneath the operating and transfer positions;

each die emplacement further includes a drive rack with a row of regularly spaced drive recesses engageable by the revolving drive elements, when the die emplacement coincides with the transfer position, the drive rack being guided for the execution of transfer movements along said transfer path;

the drive rack and a die assembly in the same die emplacement define die entrainment means for the transmission of said transfer movements from the drive rack to the die assembly; and said line couplings of each of the two sets of conditioning fluid supply lines are associated with and move with one of the two drive racks, being carried by the drive rack, at least in the absence of a die assembly.

10. A device as defined in claim 9, wherein the two drive racks are restrained in the vertical sense; and the die entrainment means include cooperating recesses and protrusions in the two drive racks and in the die assemblies which engage or disengage, respectively, when a die assembly is lowered onto, or lifted off the die emplacement.

11. A device as defined in claim 9, wherein each drive rack has attached thereto a coupling head which carries the line couplings of one of the two sets of conditioning fluid supply lines; and each coupling head is so arranged that a die assembly in the associated die emplacement is connectable thereto, for the circulation of conditioning fluid through the die assembly.

12. A device as defined in claim 11, wherein the coupling heads of the two drive racks include, on the upper side of said coupling heads, a coupling valve for each supply line coupling associated therewith; and each die assembly includes a coupling head which, when the die assembly is lowered onto a die emplacement, engages the coupling head of the drive rack in the die emplacement, so as to connect the supply line couplings to the die assembly and, at the same time, open the coupling valves.

13. A device as defined in claim 12, wherein each die assembly has on the lower side of its coupling head a plurality of coupling valves in alignment with said coupling valves of the drive rack coupling head; and the coupling valves of the two coupling heads cooperate with each other, when a die assembly is lowered onto a die emplacement, so as to open each other and to establish flow connections between the supply lines and the die assembly.

14. A device as defined in claim 12, wherein the coupling heads of the drive racks and of the die assemblies, when in engagement with each other, define means for latching the two coupling heads together, in order to prevent vertical separation.

15. A device as defined in claim 14, wherein said coupling head latching means include spring-loaded latching members which are pivotably attached to one of the two coupling heads and snap into latching engagement with the other coupling head, when a die assembly is lowered onto a die emplacement.

16. A device as defined in claim 11, wherein each die assembly includes a coupling head which, when the die assembly is lowered onto a die emplacement, engages the coupling head of the drive rack in the die emplacement; and the cooperating coupling heads of the drive rack and of the die assembly include cooperating electrical multi-conductor male and female connectors.

17. A device as defined in claim 16, wherein each die assembly has code means defined by its multi-conductor connector, the code means identifying the die assembly, for the program-controlled determination of die-related temperature conditioning parameters and other machine operating parameters.

18. A device as defined in claim 17, wherein the coupling head of each die assembly carries a male multi-conductor connector with a code plate and a connector pin for each conductor attached to the code plate; and the code means of the die assembly includes leads to the connector pins, selected ones of said leads being severed to reflect a code pattern identifying the die assembly.

19. A device as defined in claim 11, wherein each die assembly includes a coupling head which, when the die assembly is lowered onto a die emplacement, engages the coupling head of the drive rack in the die emplacement;

the coupling head of the die assembly is attached to the stationary half of the die assembly, the conditioning fluid supply lines for both die halves leading through said coupling head; and the movable half of the die assembly receives its conditioning fluid supply through flexible connecting lines extending between the stationary die half and the movable die half.

20. In an injection molding machine which includes a plurality of interchangeable injection molding dies and is equipped with die temperature conditioning means, including means for circulating conditioning fluid and for controlling the temperature of the conditioning fluid, a device for preconditioning a die assembly in an assigned waiting position, prior to insertion into the machine, while another die assembly remains in service in its normal operating position in the machine, the device comprising in combination:

means for transporting a die assembly from its assigned waiting position to the operating position, and vice versa, said die assembly transporting means including die assembly supporting means adapted to support at least two die assemblies in separate assigned waiting positions;

a first set of conditioning fluid supply lines leading from the die temperature conditioning means to the die assembly in operating position; and a second set of conditioning fluid supply lines leading from the die temperature conditioning means to the die assembly in waiting position; and wherein the two sets of conditioning fluid supply lines have flexible length portions terminating at the associated die assemblies; and the beginning points of the flexible length portions of the two sets of supply lines are spaced apart and so positioned in relation to said operating position and said assigned waiting positions of the die assemblies that the terminating point of the flexible length portion of each set of supply lines can move with the associated die assembly between the operating position and the assigned waiting position of the die assembly, remaining connected for the continued circulation of conditioning fluid.

21. A device as defined in claim 20, wherein
the temperature conditioning means includes two temperature conditioning units; and
each temperature conditioning unit is connected to one of said two sets of conditioning fluid supply lines.

22. A device as defined in claim 21, wherein
each of the two temperature conditioning units includes a stationary harness pipe surrounding a length portion of the associated set of conditioning fluid supply lines;
the two harness pipes have mouths forming the beginning points of the flexible length portions of the the two sets of supply lines;
said two assigned waiting positions of the die assembly supporting means are located laterally outside the die closing unit and offset in longitudinally opposite directions from the operating position; and
each harness pipe has its mouth located above and approximately halfway between the operating position and one of the two waiting positions.

23. A device as defined in claim 20, wherein
each die assembly has a stationary die half and a movable die half; and
the two sets of conditioning fluid supply lines have separate supply lines leading to the stationary die half and to the movable die half.

* * * * *